S. A. GARLAND.
TRACTOR WHEEL ATTACHMENT.
APPLICATION FILED JULY 18, 1921.
1,408,285.  Patented Feb. 28, 1922.
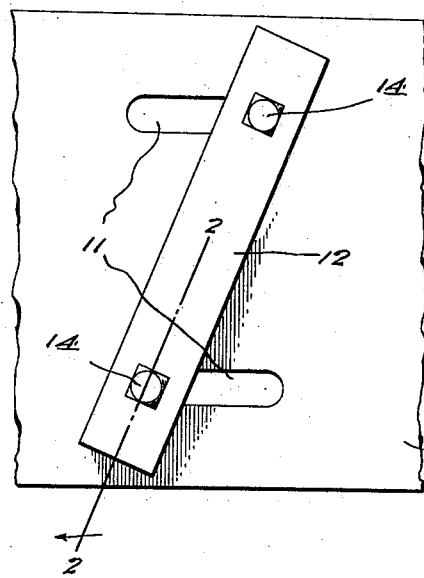
Fig. 1.
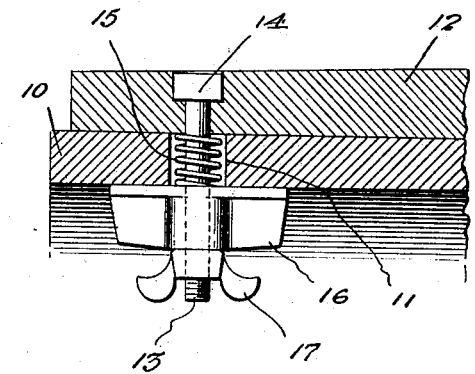
Fig. 2.
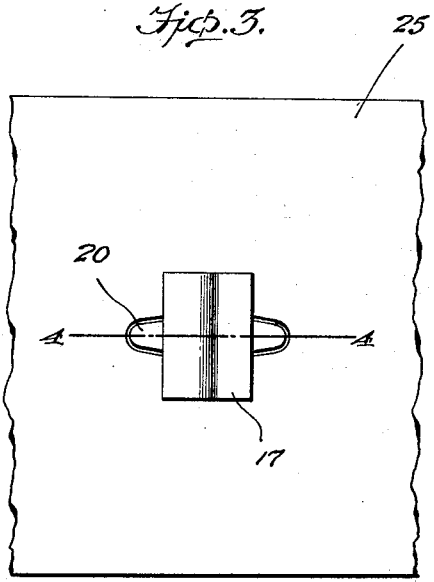
Fig. 3.
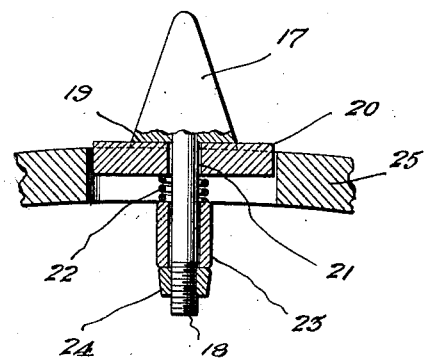
Fig. 4.
Fig. 5.
S. A. Garland, INVENTOR
BY Victor J. Evans
ATTORNEY
WITNESS:
Paul M. Hunt.

UNITED STATES PATENT OFFICE.

SAMUEL A. GARLAND, OF SALISBURY, NORTH CAROLINA.

TRACTOR-WHEEL ATTACHMENT.

1,408,285.    Specification of Letters Patent.    Patented Feb. 28, 1922.

Application filed July 18, 1921. Serial No. 485,493.

*To all whom it may concern:*

Be it known that I, SAMUEL A. GARLAND, a citizen of the United States, residing at Salisbury, in the county of Rowan and State of North Carolina, have invented new and useful Improvements in Tractor-Wheel Attachments, of which the following is a specification.

This invention relates to tractor wheels, and has particular application to the cleat and fastening means therefor.

The present method of attaching cleats to wheels of the above mentioned character, consists in the use of a bolt which is passed through the cleat and through an opening in the rim of the wheel, after which a nut is threaded on the bolt to hold the cleat in position.

When it is desired to attach or detach the cleat, it is necessary to wholly remove the nut from the bolt, before the bolt can be slipped through the opening above referred to, which requires considerable time.

It is therefore the object of the present invention to provide means whereby the cleat can be quickly and easily attached to or detached from the rim of the wheel without wholly removing the nut from the bolt, and when attached held fixed relatively to the rim in its position for use.

The nature and advantages of the invention will be better understood when the following detail description is read in connection with the accompanying drawing, the invention residing in the construction, combination and arrangement of parts as claimed.

In the drawing forming part of this application like numerals of reference indicate similar parts in the several views and wherein:

Figure 1 is a fragmentary view of a tractor wheel showing one form of cleat associated therewith in accordance with the present invention.

Figure 2 is a sectional view taken on line 2—2 of Figure 1.

Figure 3 is a view similar to Figure 1 showing another form of cleat associated with the wheel in accordance with the present invention.

Figure 4 is sectional view taken on line 4—4 of Figure 3.

Figure 5 is a detail view partly in section of the cleat shown in Figure 3.

Referring to the drawing in detail, and particularly Figures 1 and 2, 10 indicates the rim of a tractor wheel which is provided with elongated slots 11 arranged in pairs as shown to accommodate the means employed for fastening the cleat 12 to the rim. In this form of the invention, the cleat 12 is of an elongated character which extends transversely across the rim 10, and each cleat has associated therewith a pair of bolts 13. These bolts are passed through openings in said cleat with the heads of the bolts indicated at 14 counter-sunk in one side of the cleat as illustrated. Surrounding each bolt 13 is a coiled spring 15, one end of which bears against the cleat 12 and the opposite end of which bears against a clamp 16. The clamp 17 has a central opening to receive the bolt 13, the latter being threaded for a portion of its length to accommodate a thumb nut 16.

In practice, when it is desired to position the cleat 12 upon the rim of the wheel, the clamps 16 are arranged upon the bolts 13 so that they can be easily passed through the slots 11, after which the clamps are turned on the bolts to occupy positions at right angles to the slots which obviously prevents the bolts from passing through the slots with a resultant loss of the cleats. After the clamps have been turned in the manner stated the thumb screws 16 are tightened to hold the parts fixed relatively and incident to the tightening of the thumb screws, the springs 14 are compressed and act in the capacity of lock nuts. By reason of the fact that the heads of the bolts are counter-sunk in the cleats 12, it is manifest that the bolts are prevented from turning within the slots 11. The cleats can be just as quickly removed from the rim of the wheel, by slightly loosening the thumb nuts subsequently turning the clamps into alignment with the slots 11, after which the cleats and their associated parts can be quickly and easily slipped through the slots without entirely removing the thumb nuts or the clamps from the bolts.

In Figures 3 and 4 inclusive I have illustrated a modified form of cleat in which instance the cleat is equipped with a single bolt, the cleat being indicated at 17 and the bolt at 18. In this form of the invention the bolt 18 is passed into the cleat 17, and the cleat is preferably provided with a transverse groove 19 to receive a plate 20. The plate is provided with a central opening at 21 to receive the bolt 18 and when it is positioned upon the bolt, it is positioned within the groove 19 and arranged transversely of the cleat as shown. The purpose of this plate will be presently set forth. A coiled spring 22 is then placed about the bolt 18 after which the clamp 23 of similar construction to the clamp 16 above described is slipped upon the bolt. A thumb nut 24 is then threaded on the bolt to bear against the clamp 23. The rim 25 of the wheel is provided with an elongated slot through which the bolt and its associated part is passed when attaching the cleat to the wheel, or detached therefrom.

The clamp is turned upon the bolt to a position in alignment with the slot in the rim of the wheel, so that the clamp can be passed through the slot positioning the cleat upon the periphery of the wheel. The clamp is subsequently turned at a right angle to the slot as above described after which the thumb nut is tightened to hold the parts fixed relatively, assisted by the influence of the spring surrounding the bolt. The plate 20 is of a size and shape to fit within the slot in the rim of the wheel and is used to prevent the bolt from turning within the slot. This plate is not as thick as the wheel so as to provide ample space for the spring surrounding the bolt which is wholly disposed within the slot after the parts have been associated with the wheel. The construction is such that the cleat can be attached to or removed from the wheel separating either the clamp or the thumb nut from the bolt, which makes it possible to apply or remove a large number of cleats in quick order.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim is:

1. The combination with a wheel including a rim having an elongated slot, of a cleat for said wheel, a bolt associated with said cleat, a clamp carried by the bolt and designed to be passed through the slot when applying or removing the cleat, said clamp being adapted to be arranged at a right angle to said slot to hold the cleat in position, a thumb nut threaded on said bolt and adapted to bear against the clamp, and a coiled spring encircling said bolt and interposed between the clamp and said cleat for the purpose specified.

2. The combination with a wheel including a rim having a longitudinal slot, of a cleat, a bolt passed through the cleat and having a head counter-sunk in one side of the latter, a clamp carried by the bolt and designed to pass through the slot in said rim for applying or removing the cleat, said clamp being adapted to be arranged at right angles to the slot to hold the cleat in position for use, a coiled spring surrounding the bolt and interposed between the cleat and said clamp, and a thumb nut threaded on the bolt and adapted to bear against the clamp for the purpose specified.

In testimony whereof I affix my signature.

SAMUEL A. GARLAND.